United States Patent
Levine et al.

(10) Patent No.: US 9,471,458 B2
(45) Date of Patent: *Oct. 18, 2016

(54) SYNCHRONIZATION ACTIVITY RECORDING SYSTEM FOR A CONCURRENT SOFTWARE ENVIRONMENT

(71) Applicant: INTERNATIONAL BUSINESS MACHINES CORPORATION, Armonk, NY (US)

(72) Inventors: Frank Eliot Levine, Austin, TX (US); David Kevin Siegwart, Hursley (GB); Enio Manuel Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,746

(22) Filed: Aug. 29, 2014

(65) Prior Publication Data

US 2014/0373029 A1 Dec. 18, 2014

Related U.S. Application Data

(63) Continuation of application No. 13/884,643, filed as application No. PCT/IB2012/050051 on Jan. 10, 2011.

(51) Int. Cl.
*G06F 9/46* (2006.01)
*G06F 9/455* (2006.01)
*G06F 11/34* (2006.01)

(52) U.S. Cl.
CPC ....... *G06F 11/3423* (2013.01); *G06F 11/3466* (2013.01); *G06F 2201/825* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 6,434,590 B1 * | 8/2002 | Blelloch | G06F 9/5066 718/102 |
| 6,546,443 B1 | 4/2003 | Kakivaya et al. | |

(Continued)

FOREIGN PATENT DOCUMENTS

| | | |
|---|---|---|
| CN | 101334742 A | 12/2008 |
| CN | 101403982 A | 8/2009 |

(Continued)

OTHER PUBLICATIONS

International Application No. PCT/IB2012-050051, International Search Report and Written Opinion dated May 3, 2012. (9 pg).

(Continued)

*Primary Examiner* — Eric C Wai
*Assistant Examiner* — Bradley Teets
(74) *Attorney, Agent, or Firm* — Mark G. Edwards

(57) ABSTRACT

The present disclosure provides a method for identifying idleness in a processor via a concurrent software environment. A thread state indicator records an indication of a synchronization state of a software thread that is associated with an identification of the software thread. A time profiler identifies a processor of the computer system being idle and records an indication that the processor is idle. A dispatch monitor identifies a dispatch of the software thread to the processor. In response to the dispatch monitor determining the indication identifies that the processor is idle and the indication of a synchronization state of the software thread indicating the software thread ceases to execute in the processor, the dispatch monitor generates a record attributing the idleness of the processor to the software thread and the indicated synchronization state.

14 Claims, 5 Drawing Sheets

(56) References Cited

U.S. PATENT DOCUMENTS

| | | | |
|---|---|---|---|
| 6,728,955 B1 | 4/2004 | Berry et al. | |
| 6,996,745 B1* | 2/2006 | Shaylor | G06F 1/3228 714/23 |
| 7,225,309 B2 | 5/2007 | DeWitt et al. | |
| 7,421,681 B2 | 9/2008 | DeWitt et al. | |
| 7,474,991 B2* | 1/2009 | DeWitt, Jr. | G06F 9/505 702/182 |
| 7,617,499 B2 | 11/2009 | Bradford et al. | |
| 8,042,102 B2 | 10/2011 | Dewitt, Jr. et al. | |
| 8,095,921 B2 | 1/2012 | Krauss | |
| 8,219,993 B2 | 7/2012 | Johnson | |
| 8,230,423 B2 | 7/2012 | Frigo et al. | |
| 8,381,037 B2 | 2/2013 | Dewitt, Jr. et al. | |
| 2005/0081107 A1 | 4/2005 | DeWitt et al. | |
| 2005/0081206 A1 | 4/2005 | Armstrong et al. | |
| 2005/0240930 A1* | 10/2005 | Amamiya | G06F 9/3012 718/100 |
| 2006/0230408 A1 | 10/2006 | Frigo et al. | |
| 2007/0083274 A1 | 4/2007 | Krauss | |
| 2008/0244239 A1 | 10/2008 | DeWitt et al. | |
| 2009/0217277 A1 | 8/2009 | Johnson et al. | |
| 2011/0067034 A1 | 3/2011 | Kawamoto | |
| 2012/0180057 A1 | 7/2012 | Levine et al. | |
| 2013/0074085 A1* | 3/2013 | Thomson | G06F 1/3203 718/102 |
| 2013/0227586 A1 | 8/2013 | Levine et al. | |

FOREIGN PATENT DOCUMENTS

| | | |
|---|---|---|
| JP | 09179754 A | 7/1997 |
| JP | 11327951 A | 11/1999 |
| JP | 2000040022 A | 2/2000 |
| JP | 2001109538 A | 4/2001 |
| WO | 2009157127 A1 | 12/2009 |

OTHER PUBLICATIONS

U.K. application GB1313798.9; Examination report dated Oct. 24, 2013 (2 pg).

U.S. Appl. No. 13/340,486 entitled "Synchronization Activity Recording System for a Concurrent Software Environment"; Non-final office action dated May 23, 2013 (19 pg).

U.S. Appl. No. 13/340,486 entitled "Synchronization Activity Recording System for a Concurrent Software Environment"; Notice of Allowance dated Nov. 22, 2013 (24 pg).

* cited by examiner

SYNCHRONIZATION ACTIVITY RECORDING SYSTEM FOR A CONCURRENT SOFTWARE ENVIRONMENT

PRIORITY CLAIM

The present application is a continuation of U.S. patent application Ser. No. 13/884,643, titled "Recording Activity of Software Threads in a Concurrent Software Environment," filed on Aug. 20, 2012, the contents of which is incorporated herein by reference in its entirety.

TECHNICAL FIELD

The present disclosure relates to computer-implemented recording of activity for a concurrent software environment. In particular, the disclosure relates to computer-implemented recording of information relating to the synchronization state of threads in the concurrent software environment.

DESCRIPTION OF THE RELATED ART

Concurrent software environments executing software threads in a computer system employ one or more synchronization mechanisms to ensure controlled access to shared resources to avoid the simultaneous use of shared resources. Software methods executing in a concurrent software environment can be synchronized using a mutual exclusion (mutex) algorithm, a software lock, a synchronization monitor, semaphores, or other synchronization mechanisms known in the art.

High scalability of multi-threaded applications running in concurrent software environments, such as Java (Java is a trademark of Oracle Corporation), depend on tools to find areas of the software code that present opportunities to improve scalability by alleviating or addressing issues manifesting as contention to access synchronized shared resources. Identification of such areas of software code is aided by facilities for measuring occurrences of synchronization events, such as contention between software threads sharing shared resources.

However, instrumentation of software code in order to measure synchronization events presents difficulties. Contention is very sensitive to tool overhead since the execution of monitoring and measuring tools effects the synchronization dynamics of software running in a concurrent software environment.

Current tools such as the Java Lock Monitor (JLM) or the "IBM Monitoring and Diagnostic Tools for Java—Health Centre" provide monitoring and reporting of incidences of contention in the Java environment on a synchronized resource basis. However, these tools are unable to provide information on the state of a software thread at the time of contention, such as the particular software method experiencing contention. Thus, such tools cannot straightforwardly determine which software methods in an application are responsible for occurrences of contention.

Further, tools for measuring a length of time that a software thread in a particular synchronization state, such as a particular state of contention, are difficult to develop and maintain. By virtue of the nature of a concurrent software environment, the propensity for software threads to be interrupted and resumed as part of the synchronization mechanism requires complex measuring logic to determine appropriate allocation of time periods to particular synchronization states, particular software methods and particular software threads.

The present disclosure recognizes that it would therefore be advantageous to record activity of threads in a concurrent software environment to assist with in analysis of synchronization behavior to improve scalability of concurrent software.

SUMMARY

According to an embodiment of the present disclosure, there is provided, in a first aspect, an activity recording system that provides a concurrent software environment for executing software threads in a computer system. The activity recording system comprises: a thread state indicator for recording an indication of a synchronization state of a software thread in which the software thread ceases to execute in a processor of the computer system, the indication being associated with an identification of the software thread. The activity recording system also comprises a time profiler for identifying a processor of the computer system being idle and records an indication that the processor is idle. Additionally, the activity recording system further comprises a dispatch monitor for identifying the dispatch of the software thread to the processor and generating a record attributing the idleness of the processor to the software thread and the indicated synchronization state in response to the indication that the processor is idle and the indication of a synchronization state of the software thread. The activity recording system further comprises a calculation component for calculating a proportion of time for which the thread was in an indicated state.

Additionally, the time profiler identifies an idle period for the processor as a period during which the processor is continuously idle.

The record attributing the idleness of the processor attributes the idle period of the processor to the software thread and the indicated synchronization state. The processor is determined to be idle when the processor has no software thread dispatched to execute therewith.

The thread state indicator further records indications of states of a software thread including indications of a 'blocked' state, a 'wait' state, a 'runnable' state, and an unsynchronized state. An indication of a 'blocked' state of the software thread whereby the software thread is prevented from acquiring an exclusionary construct for achieving synchronization in the concurrent software environment. An indication of a 'wait' state of the software thread whereby the software thread is waiting for processing to be undertaken by a different software thread. An indication of a 'runnable' state of the software thread whereby the software thread is ready for execution in a processor of the computer system.

The indication of a synchronization state of a software thread further includes an identifier of a shared resource sought for access by the software thread. The activity recording system further comprises a resolver for determining a symbolic name associated with the identifier of a shared resource.

The time profiler may be further adapted to determine that the software routine is included in a service library of routines of the software environment, and in response to the determination, identify a calling routine for the software routine. The time profiler also identifies the calling routine using one or more of the resolver and a software call stack. The synchronization state of the software thread is determined by one or more of the software thread itself and the concurrent software environment. The exclusionary construct is one of a lock and a monitor. The shared resource is a software object. The time profiler may also be further configured to poll values of a program counter for the processor of the computer system at regular intervals. The time profiler identifies the idle period by counting a number of regular intervals during which the processor is idle. Preferably, the indication that the processor is idle includes the count of the number of regular intervals during which the processor is idle.

According to an embodiment of the present disclosure, there is provided, in a second aspect, a method for recording activity for a concurrent software environment executing software threads in a computer system. The method comprises a thread state indicator recording an indication of a synchronization state of a software thread in which the software thread ceases to execute in a processor of the computer system, the indication being associated with an identification of the software thread. The method further comprises a time profiler identifying a processor of the computer system as being idle and recording an indication that the processor is idle. The method further comprises a dispatch monitor identifying the dispatch of the software thread to the processor, and in response to the indication that the processor is idle and the indication of a synchronization state of the software thread, generating, by the dispatch monitor a record attributing the idleness of the processor to the software thread and the indicated synchronization state.

According to an embodiment of the present disclosure, there is provided, in a third aspect, an apparatus comprising: a central processing unit, a memory subsystem, an input/output subsystem, and a bus subsystem that interconnects the central processing unit, the memory subsystem, the input/output subsystem, and the apparatus as described above.

According to an embodiment of the present disclosure, there is provided, in a fourth aspect, a computer program element comprising computer program code that, when loaded into a computer system and executed thereon, causes the computer to perform the steps of the method as described above.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate by way of example preferred embodiments of the present disclosure and explain principles and advantages of the present disclosure.

DETAILED DESCRIPTION OF AN ILLUSTRATIVE EMBODIMENT

Described herein is a system, method, and computer program product for identifying idleness in a processor executing software threads in a concurrent software environment of a computer system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The corresponding structures, materials, acts, and equivalents of all means or step plus function elements in the claims below are intended to include any structure, material, or act for performing the function in combination with other claimed elements as specifically claimed. The description of embodiments of the present disclosure has been presented for purposes of illustration and description, but is not intended to be exhaustive or limited to the form disclosed. Many modifications and variations will be apparent to those of ordinary skill in the art. The embodiment was chosen and described in order to best explain the principles and the practical application, and to enable others of ordinary skill in the art to understand various embodiments of the disclosure with various modifications as are suited to the particular use contemplated.

Figure 1:
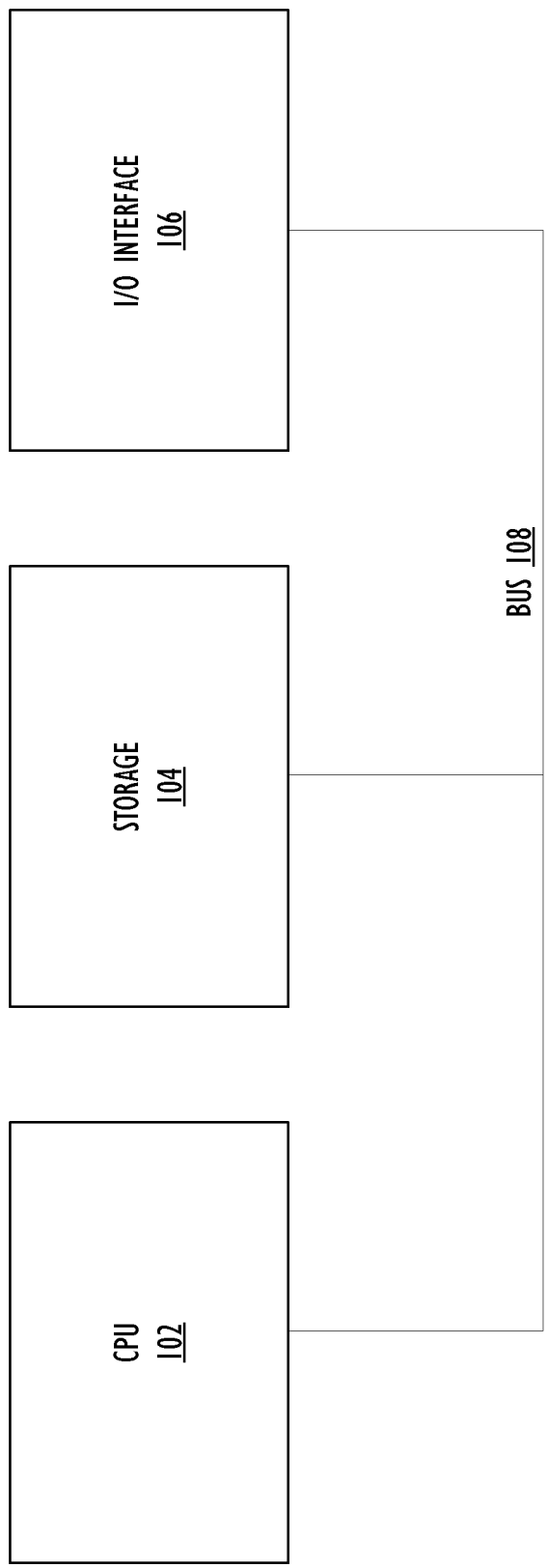
FIG. 1 illustrates a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. Storage 104 can be any read/write storage device such as a random access memory (RAM) or a non-volatile storage device. An example of a non-volatile storage device includes a disk or tape storage device. I/O interface 106 interfaces with devices that provide input or output of data or both input and output of data. Examples of I/O devices connectable to I/O interface 106 include a keyboard, a mouse, a display (such as a monitor), and a network connection.

Figure 2:
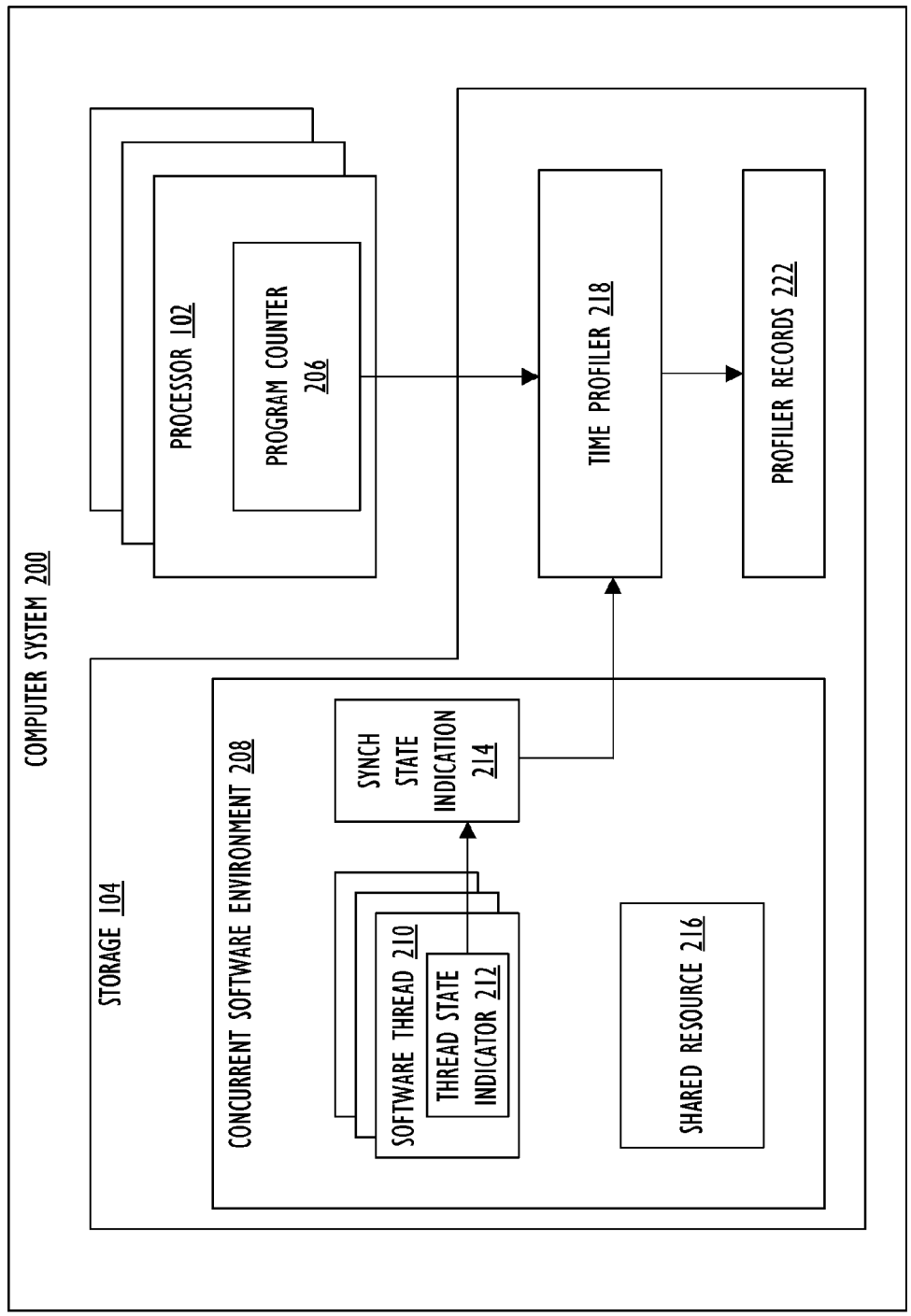
FIG. 2 illustrates an arrangement of an activity recording system implemented in a computer system according to an embodiment of the present disclosure.

FIG. 2 illustrates an arrangement of an activity recording system implemented in a computer system 200 according to an embodiment of the present disclosure. Computer system 200 includes one or more processors 102 for executing instructions. Each processor 102 in the computer system 200 includes a program counter 206 as a register or another suitable store for storing a value indicating a current position in a sequence of instructions executed by processor(s) 102. Program counters are also known as instruction pointers, instruction address registers, or instruction sequencers. Program counter 206 can hold an address for an instruction currently being executed or, alternatively, can hold an address for a next instruction to be executed depending on a particular arrangement of processor(s) 102.

Preferably, processors 102 are multiple independent processors in a multiprocessor computer system. However, processors 102 can also be constituted as separate computing systems organized in a network of interoperating computer systems, such as an array of computer systems. Each system in such an array can independently contain the essential features of a computer system outlined above with respect to FIG. 1. For example, processors 102 can be constituted within a rack computer arrangement, a blade server or other suitable array of computer systems. In a further alternative, processors 102 can be constituted as separate processing elements of a single processor, such as separate processing cores of a processor unit. Combinations of such processor arrangements conceived here are also suitable in embodiments of the one or more processors 102.

Computer system 200 further includes storage 104 which may be, for example, a volatile memory store. Storage 104 stores a time profiler 218. Time profiler 218 is a component for recording values of program counter 206 for processor(s) 102 in computer system 200. The values of program counter 206 are recorded as profiler records 222 in storage 104, an alternative memory, or other store associated with computer system 200.

In operation, time profiler 218 interrupts the execution of processor 102 periodically (known as a profiler 'tick') to record a value of program counter 206 before resuming execution of interrupted instructions. A value of program counter 206 corresponds to an address in the storage 104 of an instruction in an instruction sequence for a software thread 210 executing on processor 102 at the time of the profiler interruption (the tick). The interruptions take place at regular intervals such that a value of program counter 206 is polled at regular intervals by time profiler 218. Time profiler 218 can be further operable to record values of program counters for multiple processors in computer system 200, including creating a record of an identifier of a processor corresponding to each value of a program counter 206.

As will be apparent to those skilled in the art, time profiler 218 can be implemented entirely in software stored in the store 104. For example, time profiler 218 can be based on an application tool, such as the "TProf" Time Profiler tool developed by IBM and detailed at perfinsp.sourceforge.net/tprof.html (IBM is a registered trademark of International Business Machines Corporation).

Alternatively, time profiler 218 can be implemented outside the store 104 embodied entirely in hardware, or a combination of both software and hardware. For example, the time profiler 218 can be a software routine executing on computer system 200, such as an operating system or kernel function, having close cooperation with the one or more processors 102 of the computer system 200. Alternatively, time profiler 218 can employ processor instructions specifically directed to storing a value of program counter 206. In another embodiment, time profiler 218 may be a function of a Just In Time (JIT) compiler for the concurrent software environment 208, known as a "sampling thread".

Storage 104 further stores a concurrent software environment 208. Concurrent software environment 208 is an environment in which software is designed as a collection of one or more computational processes suitable for execution simultaneously in parallel. Notably, the suitability for such parallel simultaneous execution does not necessarily require that concurrent software is actually executed in parallel. A concurrent software environment can imitate parallel execution using a single processor, or can implement true parallel execution using multiple processors, such as in any of the arrangements of processor(s) 102 described above. Concurrent programs can be executed sequentially on a single processor by interleaving the execution steps of each computational process, or executed in parallel by assigning each computational process to one of a set of processors that are close or distributed across a network. An example of such a concurrent software environment is a Java Runtime Environment.

A plurality of software threads 210 in computer system 200 execute concurrently in the concurrent software environment 208 as concurrent computational processes. For example, software threads 210 are threads of execution in a Java program including software methods executing for instantiated Java objects.

Software threads 210 are each operable to access a shared resource 216. Shared resource 216 can be any resource suitable for access by threads in concurrent software environment 208 such as a hardware or software resource, shared memory area or other storage, a device, processor or any other resource. For example, the shared resource 216 can be a Java object, such as a Java object including synchronized software methods in the Java environment.

The concurrent software environment 208 employs one or more synchronization mechanisms to ensure controlled access to the shared resource 216 and in order to avoid the simultaneous use of the shared resources 216 by multiple software threads 210.

For example, concurrent software environment 208 can synchronize software threads 210 using a mutual exclusion (mutex) algorithm, a software lock, a synchronization monitor, semaphores or other synchronization mechanisms known in the art. Such mechanisms can employ an exclusionary construct to avoid the simultaneous use of shared resource 216. Exclusionary constructs used in such synchronization mechanisms can include locks, monitors and semaphores.

For example, software threads 210 accessing a software object having a synchronized software method as shared resource 216 can be synchronized by the use of a software monitor to restrict access to the software object to a single thread at any one point in time. Different states of operation can be used to describe a thread operating in environments synchronized by exclusionary constructs.

A software thread 210 executing in computer system 200 which seeks to obtain access to shared resource 216 can be said to seek to "acquire" an exclusionary construct associated with shared resource 216. Similarly, a thread 210 currently having synchronized access to shared resource 216 can be said to be "holding" an exclusionary construct associated with shared resource 216, also known as a "held" state of software thread 210.

Synchronization mechanisms to achieve the sharing of shared resource 216 involve threads entering other states of operation. A synchronization mechanism can require a thread 210 seeking to acquire an exclusionary construct to enter a "spin" state before it can hold the exclusionary construct. A thread in the "spin" state is actively executing on a processor 102 but is unable to access the shared resource 216 associated with the exclusionary construct. Normally, a thread in a "spin" state is not able to perform useful work as it seeks to acquire the exclusionary construct. Thus such threads normally do not execute other software routines or methods while in the "spin" state.

Synchronization mechanisms can lead to thread 210 failing to acquire an exclusionary construct for shared resource 216 leaving the thread in a "blocked" state, unable to access shared resource 216. Threads in a "blocked" state are unable to execute and cease to be subject to processing by any processor(s) (e.g. processors 102) in computer system 200 while in the "blocked" state. Such blocking can be temporary until the exclusionary construct subsequently becomes available for thread 210 to acquire.

A thread (e.g. thread 210) holding an exclusionary construct can enter a "wait" state while that thread waits for processing to be undertaken by another thread. Such "wait" states are normally exited by receipt of a notification or, in the case of "timed wait" states, by expiry of a predefined time period. A software thread 210 in the "wait" and "timed wait" states is unable to execute and cease to be subject to processing by any processor(s) 102 in the computer system 200 until the notification is received by software thread 210 or the time period expires. Threads which enter a "wait" state normally release an exclusionary construct and re-acquire it when they exit the "wait" state.

Further, threads 210 can be in a "runnable" state, being a state where a thread 210 is able and ready to execute on processor(s) 102 of the computer system 200 but where processor(s) 102 is currently not yet assigned to thread 210 for execution.

Each of software threads 210 includes a thread state indicator 212 for recording an indication of a current synchronization state 214 for thread 210. Synchronization state indication 214 is associated with a particular thread and can indicate any or all of the states of: "held", "spin", "blocked", "wait" (either "wait" or "timed wait"), "runnable", and an indication of an unsynchronized state of the particular thread. In one embodiment, synchronization state indication 214 is set by the software thread 210 itself. In an alternative embodiment, synchronization state indication 214 is set by concurrent software environment 208, such as by a virtual machine in a Java Runtime Environment.

The arrangement of FIG. 2 will now be described in use to demonstrate the advantages of embodiments of the present disclosure. In use, synchronization state indication 214 is set at, shortly before, or shortly after, a change to the synchronization state of software thread 210. For example, a software thread 210 that is about to acquire a synchronization construct for access to the shared resource 216 updates synchronization state indication 214 to reflect a 'held' state. Similarly, a software thread 210 that is about to enter a 'spin' state updates synchronization state indication 214 to reflect a 'spin' state.

In use, time profiler 218 polls and records regular values of program counter 206 for each of the one or more processor(s) 102 to profiler records 222. Time profiler 218 is adapted to record a synchronization state to profiler records 222 for a software thread 210 executing on a polled processor 102. The synchronization state is based on an identification of which software thread 210 is executing on the polled processor(s) 102 and the synchronization state indication 214 stored by software thread 210. State information for threads in states which involve executing on one of the one or more processor(s) 102 can be determined and recorded in this way. This includes the 'spin', the 'held' state, and the unsynchronized execution state.

Thus, in use, the arrangement of FIG. 2 is operable to record synchronization "held" and "spin" state information for threads 210 executing in concurrent software environment 208 at regular time intervals by polling of time profiler 218. Such polling can be a fine grained or atomic process presenting extremely low processing overhead for computer system 200 and, thus, has a substantially negligible impact on the synchronization dynamics of concurrent software environment 208. Also, with respect to concurrent software environment 208, the processing of time profiler 218 is passive insofar as the polling of program counter 206 values and synchronization state indication 214 do not require the active involvement of concurrent software environment 208. Further, the regularly timed synchronization "held" and "spin" state information for multiple software threads 210 can inform a process of analyzing the synchronization behavior of software threads 210 to improve efficiency, operability and scalability of concurrent software environment 208.

In one embodiment, each value of program counter 206 is resolved to an identification of an executing software method for a thread executing on processor(s) 102. For example, time profiler 218 can use a resolver to determine, for each address value of the program counter 206 recorded by time profiler 218, a symbolic name identifying software code for a software thread 210 including an instruction stored at the address. Thus, symbol names including function, procedure, subroutine or method names in a software thread 210 are retrieved by the resolver for each address recorded by time profiler 218. The resolver can be a function of time profiler 218 or can be a supplementary function or tool stored in storage 204.

The arrangement of FIG. 2 can further include a calculation component (not pictured) for calculating a proportion of the regular intervals profiled by time profiler 218 for which a software thread 210 was in a particular synchronization state. For example, a percentage of total time that a software thread 210 was in a 'held' state can be calculated. A calculation component can be comprised as part of time profiler 218. Alternatively, a calculation component can be a separate or additional software or hardware component capable of interacting with profiler records 222 generated by the profiler component 218.

In one embodiment, the thread state indicator 212 additionally records an identification of the shared resource 216 sought for access by the software thread 210. For example, the thread state indicator 212 can record the identification along with the synchronization state indication 214. Such identification can include, for example, a class name of an object or an identifier of a synchronized software method, routine, device, data item or other shared resource. Further, in one embodiment, the resolver is operable to determine a symbolic name associated with an identifier of shared resource 216 recorded by the thread state indicator 212. For example, a name of a software routine such as a software method or function is recorded with the synchronization state indication 214. Where the shared resource 216 includes software objects including objects having synchronized routines, such as a synchronized software method. The shared resource 216 might correspond to a routine in a service library called by a calling software routine, such as a class library, a standard library, a service routine, or a primitive method or function. In such situations it can be unhelpful to record an indication of the routine itself (since such routines can be called frequently by many methods) and instead, an identifier of a 'calling' routine can be determined and recorded additionally or instead. A 'calling' routine can be identified from a call stack and/or resolver.

Figure 3:
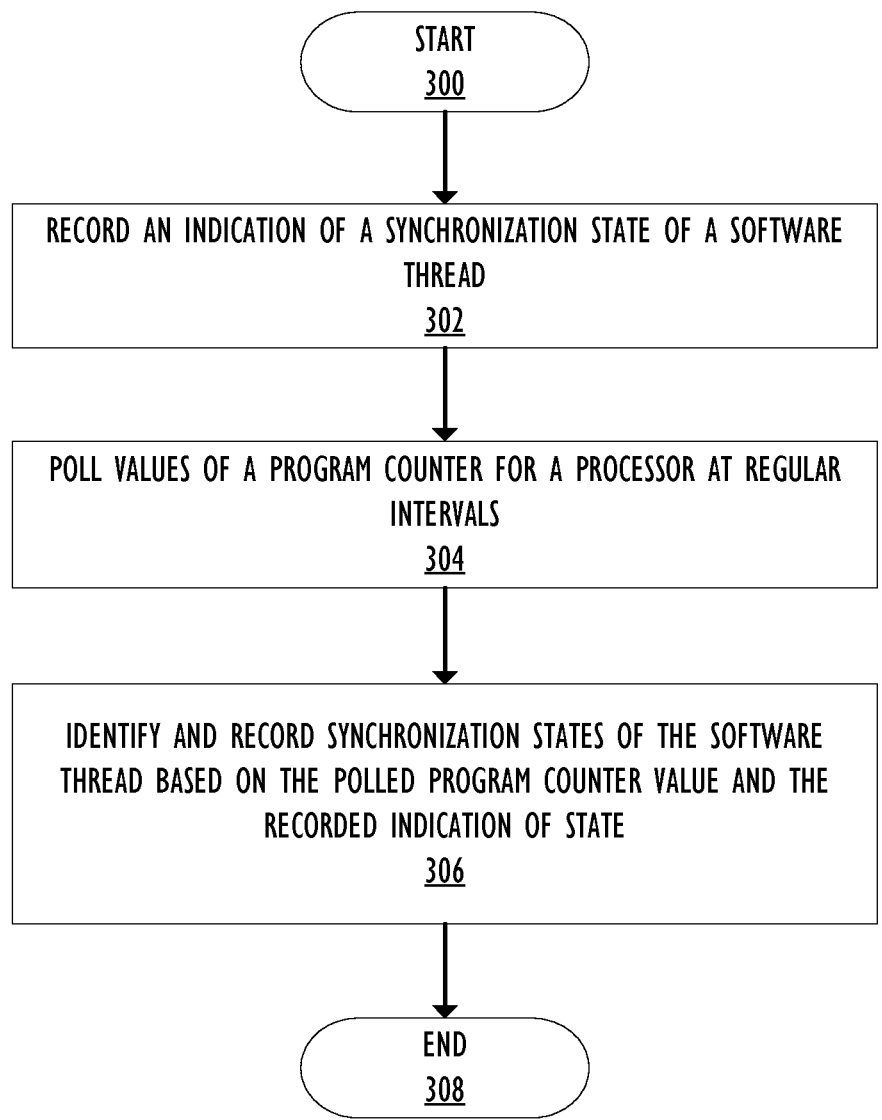
FIG. 3 illustrates a flow diagram of a method for recording activity for the concurrent software environment executing software threads in the computer system according to an embodiment of the present disclosure.

FIG. 3 is a flowchart of a method for recording activity for concurrent software environment 208 executing software threads in computer system 200 according to an embodiment of the present disclosure. At step 302 thread state indicator 212 records a synchronization state indication 214 of a synchronization state for a software thread 210. The synchronization state indication 214 is associated with an identification of software thread 210. At step 304, time profiler 218 polls values of program counter 206 for the one or more processors 102 at regular intervals. At step 306 the time profiler 218 identifies and records one or more synchronization states of the software thread 210 based on the polled program counter value 206 and the recorded synchronization state indication 214. The process then terminates at block 308.

The embodiments described above are suitable for recording synchronization "held" and "spin" state information for threads 210 actively executing on one or more of processor(s) 102. The above embodiments rely on polling program counter 206 and thread synchronization state indication 214 and so only provide useful information for threads actively executing on a processor 102. Threads not actively executing on a processor 102, such as threads in a "blocked", "wait" (either "wait" or "timed wait") or "runnable" states, will not be identified by the polling of time profiler 218 described above. Accordingly, an additional approach is required to record activity for threads in these states.

Figure 4:
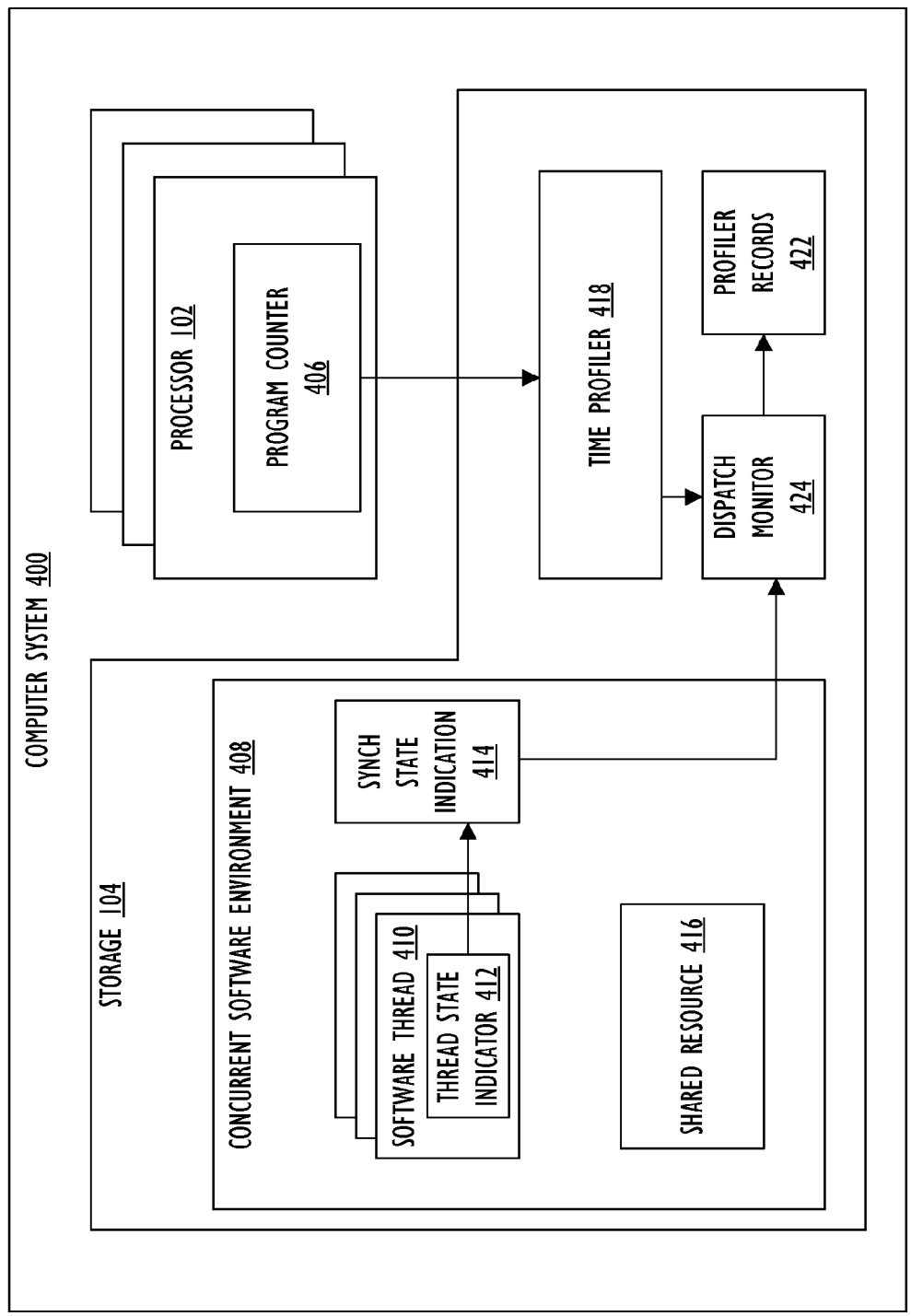
FIG. 4 illustrates a block diagram of an enhanced arrangement of an activity recording system implemented in a computer system according to an embodiment of the present disclosure.

FIG. 4 illustrates an enhanced arrangement of an activity recording system implemented in a computer system 400 according to an embodiment of the present disclosure. Many of the features of FIG. 4 are identical to those described above with respect to FIG. 2 and these will not be repeated here. The arrangement of FIG. 4 is enhanced with respect to FIG. 2 in that the arrangement of FIG. 4 is suitable for recording synchronization state information for software threads 410 in concurrent software environment 408 where the threads are not actively executing in processor(s) 102 of computer system 400. The arrangement depicted in FIG. 4 can supplement the arrangement of FIG. 2 such that, in certain embodiments, the features described with respect to FIG. 2 can be implemented in addition to the features described below with respect to FIG. 4.

The thread state indicator 412 of FIG. 4 is operable to record indications of a synchronization state of software threads 410 in which the software thread ceases to execute in processor(s) 102 of the computer system 400. Thus, in the arrangement of FIG. 4, the thread state indicator 412 records indications of "blocked", "wait" (either "wait" or "timed wait") and "runnable" states to synchronization state indication 414. Otherwise the thread state indicator 412 of FIG. 4 is substantially identical to that described above with respect to FIG. 2.

Time profiler 418 of FIG. 4 is operable to identify one or more processor(s) 102 being idle. Processor(s) 102 is considered to be idle if none of the software threads 410 are dispatched to execute on processor(s) 102. Time profiler 418 records such idleness by storing an indication that processor(s) 102 is idle at a particular point in time. In an alternative embodiment, time profiler 418 is further operable to identify a time period over which processor(s) 102 is continuously idle as an idle period for the processor 102.

The storage 104 of FIG. 4 further stores dispatch monitor 424. Dispatch monitor 424 is operable to identify when software thread 410 is dispatched for execution on processor(s) 102. Dispatch monitor 424 can be implemented as a software routine coexisting with concurrent software environment 408 and time profiler 418. Alternatively, dispatch monitor 424 can be implemented in an operating system or kernel of computer system 400. Dispatch monitor 424 can also be implemented entirely or partly in hardware.

In use, dispatch monitor 424 identifies a dispatch of software thread 410 to processor(s) 102. In response to such identification, dispatch monitor 424 determines if processor(s) 102 to which the thread is dispatched was idle immediately before the dispatch by reference to time profiler 418. If it is determined processor(s) 102 was idle, dispatch monitor 424 obtains a synchronization state of dispatched thread 410 to determine if dispatched thread 410 is in a synchronization state that may account for the idleness of the processor(s) 102. For example, if synchronization state indication 414 for dispatched software thread 410 indicates that the software thread 410 was blocked (a "blocked" state) up to the point of dispatch, the blocking may account for the idleness of processor(s) 102. Such conclusions can be drawn for "blocked", "wait" ("wait" and "timed wait") and "runnable" states of software threads 410. In an alternative embodiment, when a continuous idle period is recorded for a processor(s) 102, the synchronization state may account for the idle period and may be attributed to idle period.

Where the dispatch monitor identifies a synchronization state of a dispatched thread 410 that accounts for the idleness of a processor(s) 102, the dispatch monitor generates a record of the synchronization state of the thread, such as in profiler records 422, and attributes the idleness to the dispatched thread and the indicated synchronization state of dispatched thread 410. In this way idleness of processor(s) 102 that may be caused by particular synchronization states of software threads 410 are attributed to those states and threads.

Thus the arrangement of FIG. 4 is operable to record synchronization "blocked", "wait" and "runnable" state information for software threads 410 executing in concurrent software environment 408 and attribute such states to idleness of processor(s) 102 identified by time profiler 418. Checking and polling by time profiler 418 and the dispatch monitor 424 can be fine grained or atomic processes presenting extremely low processing overhead for computer system 400 and, thus, have a substantially negligible impact on the synchronization dynamics of concurrent software environment 408. Also, with respect to concurrent software environment 408, the processing of time profiler 418 and dispatch monitor 424 is passive insofar as the checking for idleness of processor(s) 102 and polling of synchronization state information 414 and does not require the active involvement of concurrent software environment 408. Further, the records of "blocked", "wait" and "runnable" state information for the multiple software threads 410 can inform a process of analyzing the synchronization behavior of the software threads 410 to improve efficiency, operability and scalability of concurrent software environment 408.

Figure 5:
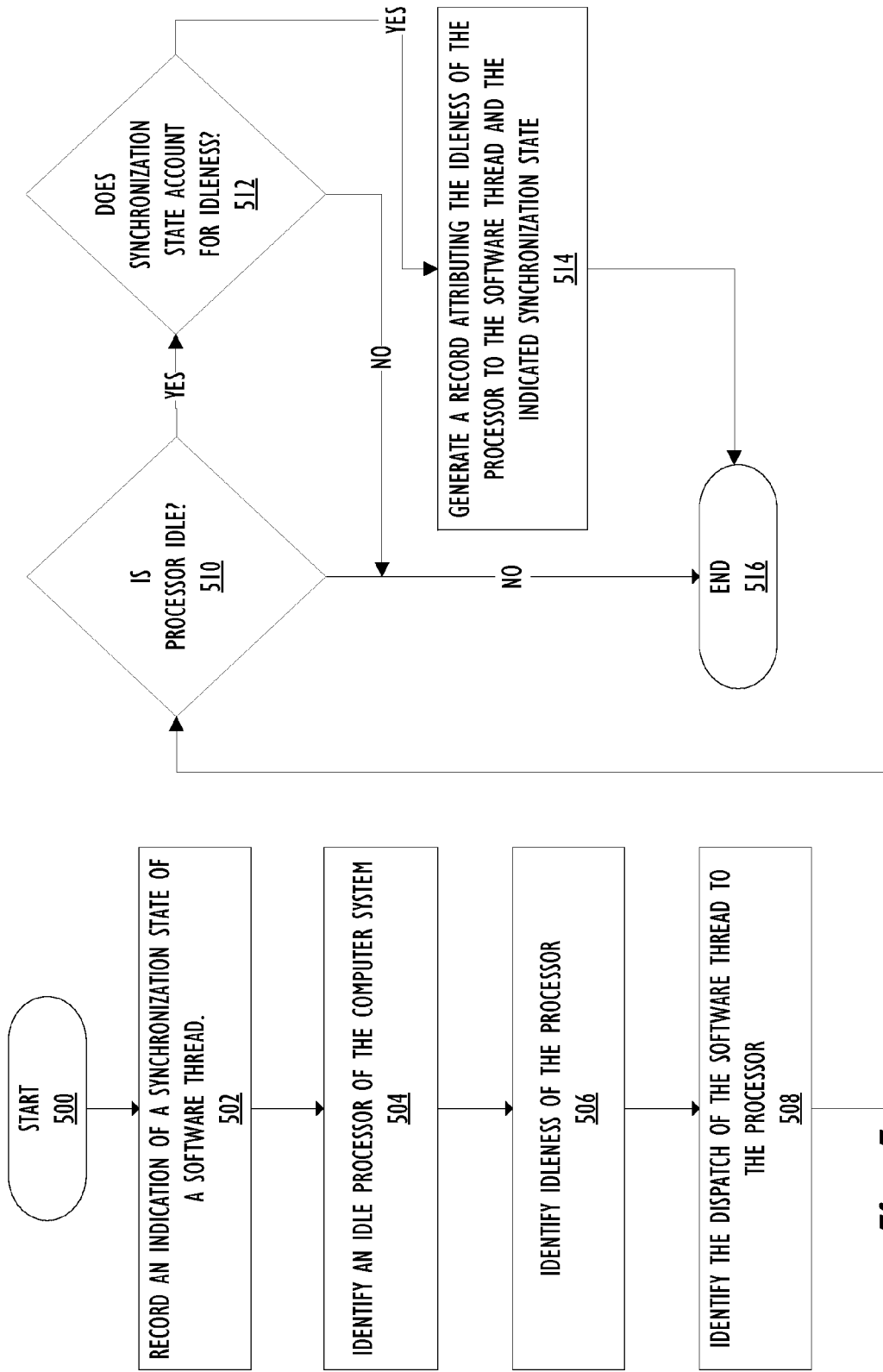
FIG. 5 illustrates a flow diagram of an enhanced method for recording activity for the concurrent software environment executing software threads in the computer system according to an embodiment of the present disclosure.

FIG. 5 is a flowchart of a method for recording activity for concurrent software environment 408 executing software threads 410 in the computer system 400 according to an embodiment of the present disclosure. At step 502 the thread state indicator 412 records a synchronization state indication 414 of software thread 410 in which software thread 410 ceases to execute in processor(s) 102 of the computer system 400. Synchronization state indication 414 is associated with an identification of the software thread 410. At step 504 time profiler 418 identifies an idle processor(s) 102 of the computer system 400 and records an indication that the processor is idle. At step 506 time profiler 418 identifies an idleness of the processor(s) 102. In one embodiment, the idleness is identified as an idle period during which processor(s) 102 is continuously idle. At step 508 dispatch monitor 424 identifies the dispatch of software thread 410 to the processor(s) 102. At step 510 it is determined if processor(s) 102 is idle. If processor(s) 102 is determined to not be idle, the process terminates at block 516. If processor(s) 102 is determined to be idle, it is then determined if the synchronization state of software thread 410 accounts for the idleness of processor(s)

102 (e.g. a "blocked", "wait" or "runnable" state), as shown at step 512. If the synchronization state of software thread 410 does account for the idleness of processor(s) 102, dispatch monitor 424 generates a record in the profiler records 422 attributing the idleness of the processor(s) 102 to software thread 410 and the indicated synchronization state for software thread 410 (step 514). Time profiler 418 is further operable to reset the indication that processor(s) 102 is idle in response to dispatch monitor 424 identifying the dispatch of the software thread 410 to the processor(s) 102. The process then terminates at block 516.

The arrangement of FIG. 4 can further include a calculation component (not pictured) for calculating a proportion of time profiled by time profiler 418 and dispatch monitor 424 for which software thread 410 was in a particular synchronization state. For example, a calculation of a percentage of total time that processor(s) 102 is idle being attributed to software thread 410 being in a "blocked" state. Such calculation component can be comprised as part of time profiler 418 or as part of dispatch monitor 424. Alternatively, such calculation component can be a separate or additional software or hardware component.

In one embodiment, the time profiler 418 of FIG. 4 can further include the regular program counter polling features of time profiler of FIG. 2. The program counter polling conducted by time profiler 418 can be employed to measure an idle period for an idle processor by counting a number of regular intervals during which processor(s) 102 is idle. Further, the idle period can be recorded by time profiler 418 as a count of regular intervals along with the indication that processor(s) 102 idle. In one embodiment, the indication that the processor is idle includes the count of the number of regular intervals during which the processor is idle.

In another embodiment, thread state indicator 412 additionally records an identification of shared resource 416 sought for access by software thread 410, as described above with respect to FIG. 2. The arrangement of FIG. 4 can further include the resolver described above with respect to FIG. 2 for performing resolution of symbolic names.

Embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system.

Suitably, the computer program is stored on a carrier device in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure. In the context of this document, a carrier medium may be any tangible medium that can contain, or store a program for use by or in connection with an instruction execution system, apparatus, or device.

In the apparatus, computer readable storage device, and method of the present disclosure, the components or steps may be decomposed and/or recombined. The decomposition and/or recombination may be viewed as equivalent solutions of the present disclosure. Moreover, the steps executing the above series of processing may be naturally performed in time order according to the sequence of the description, but they may not necessarily be performed in time order. Some steps may be performed in parallel or independently of each other.

While the disclosure has been described with reference to exemplary embodiments, it will be understood by those skilled in the art that various changes may be made and equivalents may be substituted for elements thereof without departing from the scope of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. In addition, many modifications may be made to adapt a particular system, device or component thereof to the teachings of the disclosure without departing from the essential scope thereof. The embodiment was chosen and described in order to best explain the principles of the disclosure and the practical application, and to enable others of ordinary skill in the art to understand the disclosure for various embodiments with various modifications as are suited to the particular use contemplated. Therefore, it is intended that the disclosure not be limited to the particular embodiments disclosed for carrying out this disclosure, but that the disclosure will include all embodiments falling within the scope of the appended claims.

Although the present disclosure and advantages thereof have been described in detail, it will be understood that various changes, substitution and transformation may be made thereto without departing from the spirit and scope of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A method for recording activity for a concurrent software environment executing one or more software threads in a computer system comprising a plurality of processors, each processor comprising a program counter, the method comprising:
  recording, by a thread state indicator, an indication of a synchronization state of a software thread of the one or more software threads in which the software thread ceases to execute in a processor of the plurality of processors of the computer system, wherein the indication of the synchronization state is associated with an identification of the software thread;
  polling at regular intervals, by a time profiler, values of the program counter for the processor;
  identifying, by the time profiler and based on the values of the program counter, the processor of the computer system becoming idle, wherein the processor is idle when the value of the program counter indicates that the processor has no software thread dispatched to execute therewith;
  identifying, by a dispatch monitor, a dispatch of the software thread to the processor;
  recording, by the time profiler, an indication that the processor is idle; and
    generating, in response to the recording of the indication that the processor is idle and the indication of the synchronization state of the software thread indicating the software thread ceases to execute in the processor, a record, wherein the record attributes an idleness of the processor to the software thread and the indicated synchronization state.

2. The method of claim 1, further comprising:
identifying, by the time profiler, an idle period for the processor as a period during which the processor is continuously idle, and wherein the record attributing the idleness attributes the idle period of the processor to the software thread and the indicated synchronization state.

3. The method of claim 1, further comprising:
calculating, by a calculation component, a proportion of time for which the software thread was in an indicated state.

4. The method of claim 1, further comprising:
recording by the thread state indicator:
  an indication of a blocked state of the software thread, wherein during a blocked state the software thread is prevented from acquiring an exclusionary construct for achieving synchronization in the concurrent software environment;
  an indication of a wait state of the software thread, wherein during a wait state the software thread is waiting for processing to be undertaken by a different software thread; and
  an indication of a 'runnable' state of the software thread, wherein during a runnable state the software thread is ready for execution in a processor of the computer system; and
  an indication of an unsynchronized state of a software thread.

5. The method of claim 4, wherein the indication of a synchronization state of the software thread further includes an identifier of a shared resource sought for access by the software thread.

6. The method of claim 5, further comprising:
determining, by a resolver, a symbolic name associated with the identifier of a shared resource.

7. The method of claim 6, further comprising:
determining, by the time profiler and based on the symbolic name, that the shared resource is a software routine included in a service library of routines of the software environment, and in response to the determination, to identify a calling routine for the software routine.

8. The method of claim 7, further comprising:
identifying, by the time profiler, the calling routine using one or more of the resolver and a software call stack.

9. The method of claim 5, wherein the shared resource is a software object.

10. The method of claim 4, wherein the exclusionary construct is one of a lock and a monitor.

11. The method of claim 1, further comprising:
determining the synchronization state of the software thread by one or more of the software thread itself and the concurrent software environment.

12. The method of claim 1, further comprising:
identifying, by the time profiler, the idle period by counting a number of regular intervals during which the processor is idle.

13. The method of claim 12, wherein the indication that the processor is idle includes the count of the number of regular intervals during which the processor is idle.

14. The method of claim 1, wherein attributing the idleness of the processor to the software thread and the indicated synchronization state comprises:
determining, based on the program counter and the dispatch of the software thread, that the idleness of the processor is caused by the indicated synchronization state.

* * * * *